Dec. 18, 1934.   M. E. DAVIS   1,984,919
METHOD AND APPARATUS FOR MAKING SKIVED OR BEVEL
EDGED ARTICLES FROM FLEXIBLE MATERIAL
Filed Jan. 26, 1931   5 Sheets-Sheet 1
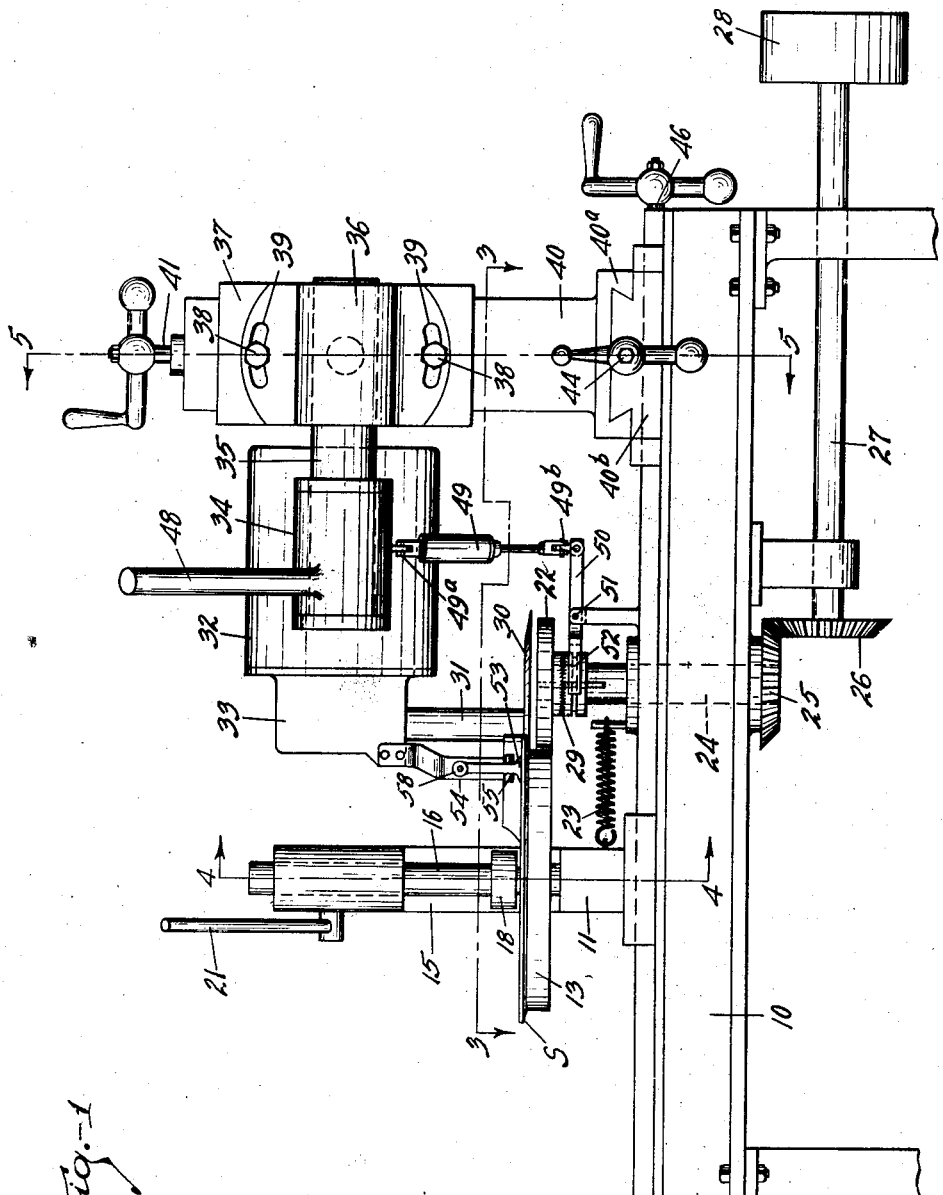
INVENTOR
MAURICE E. DAVIS.
BY
ATTORNEYS

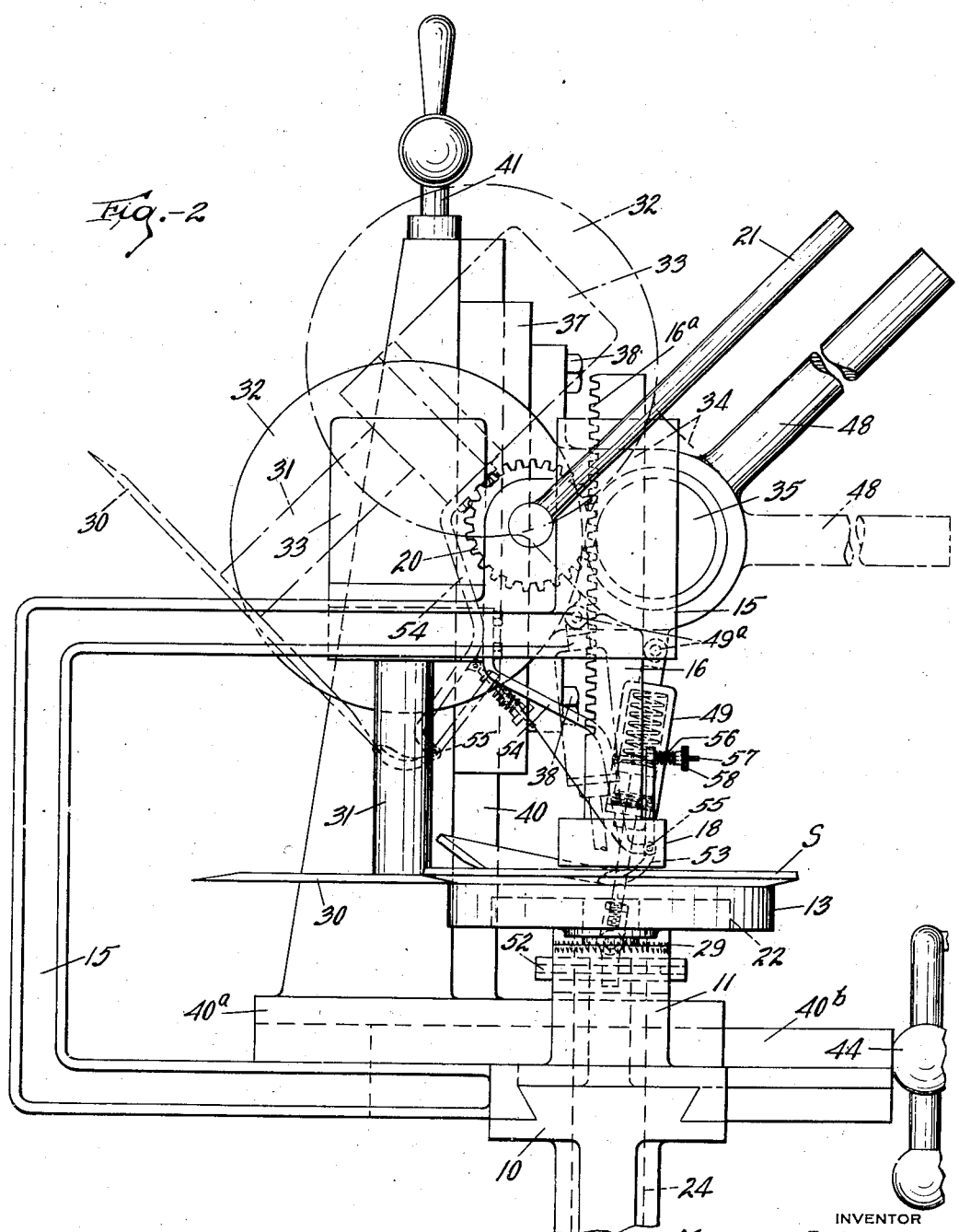

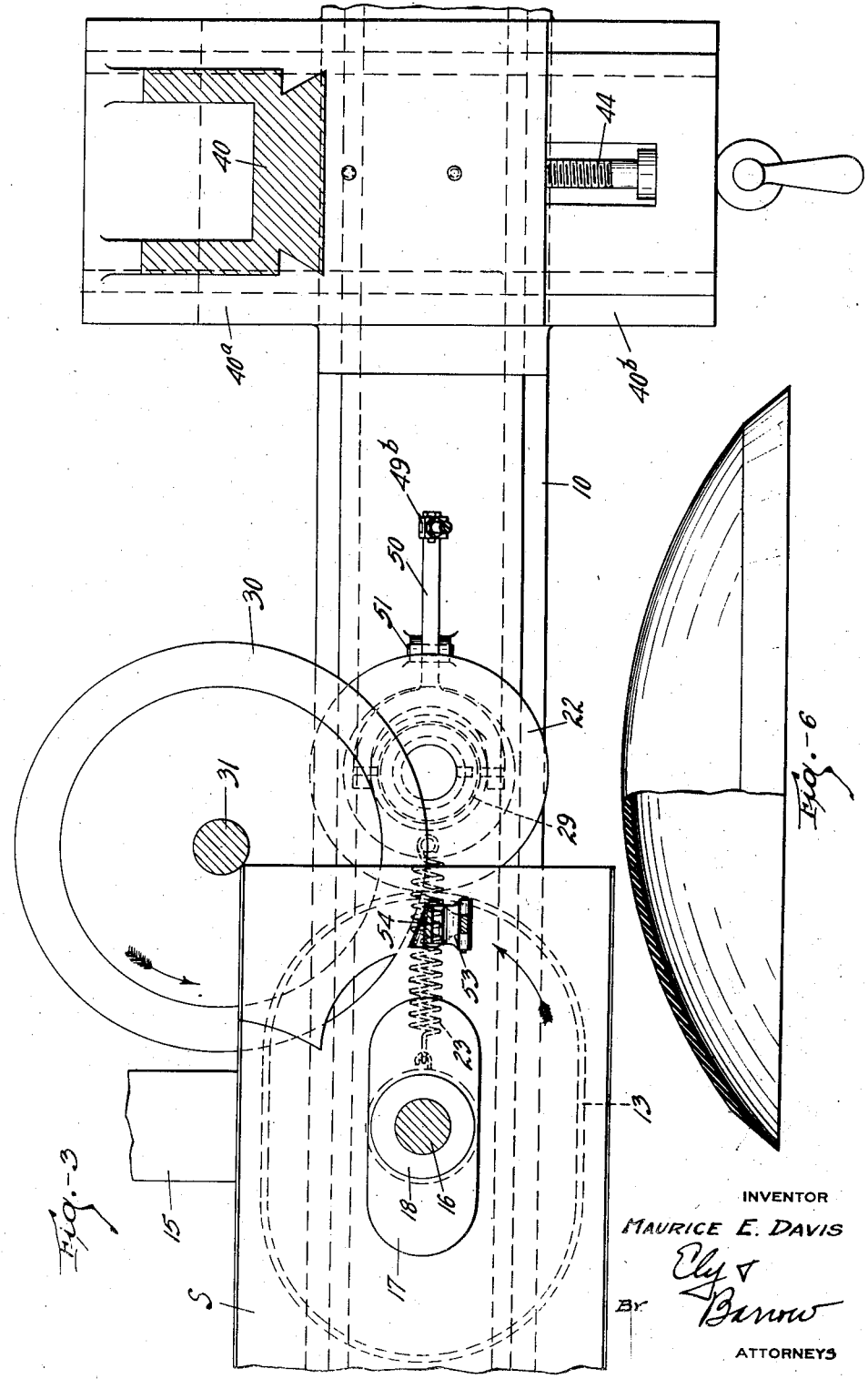

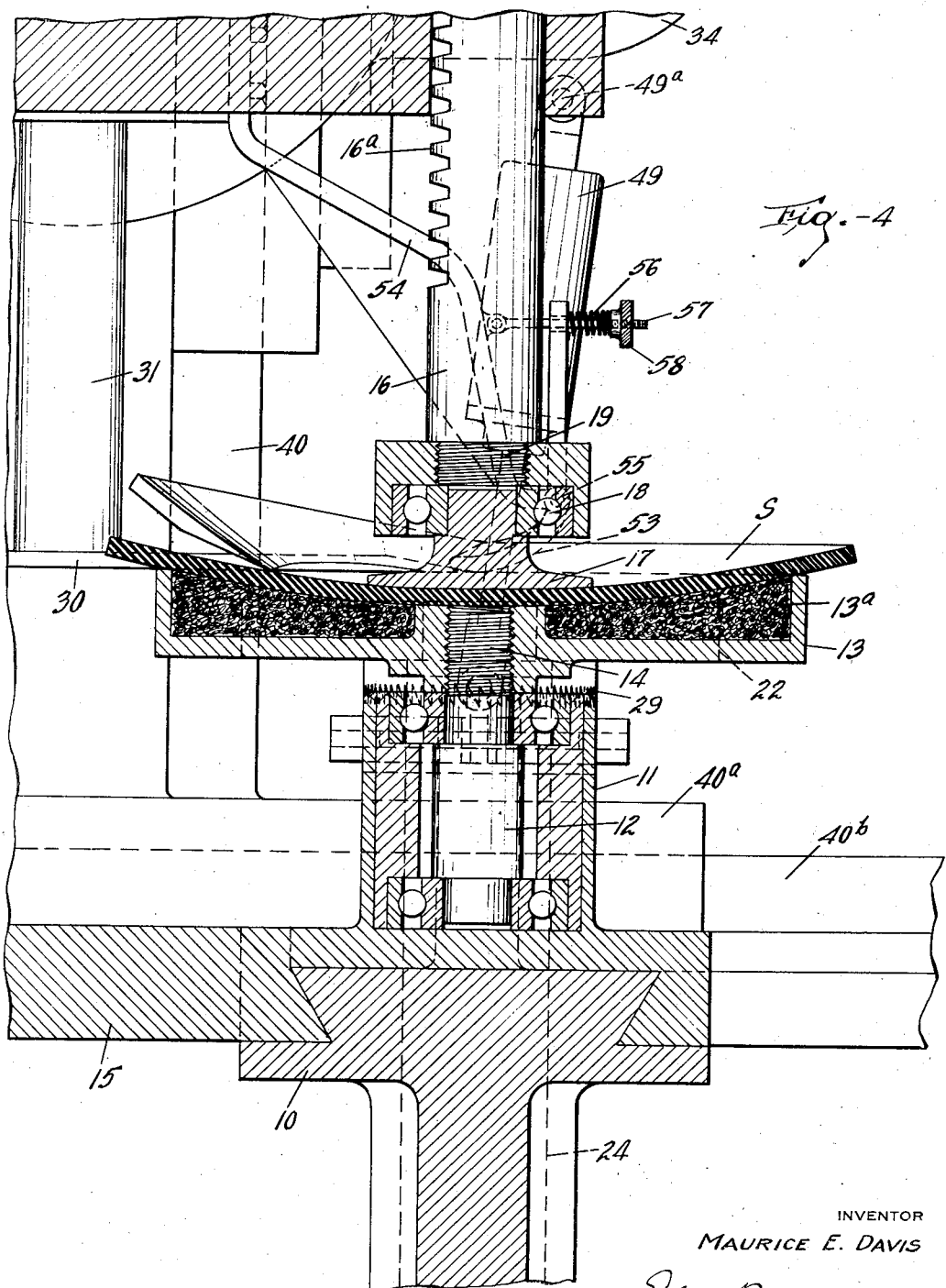

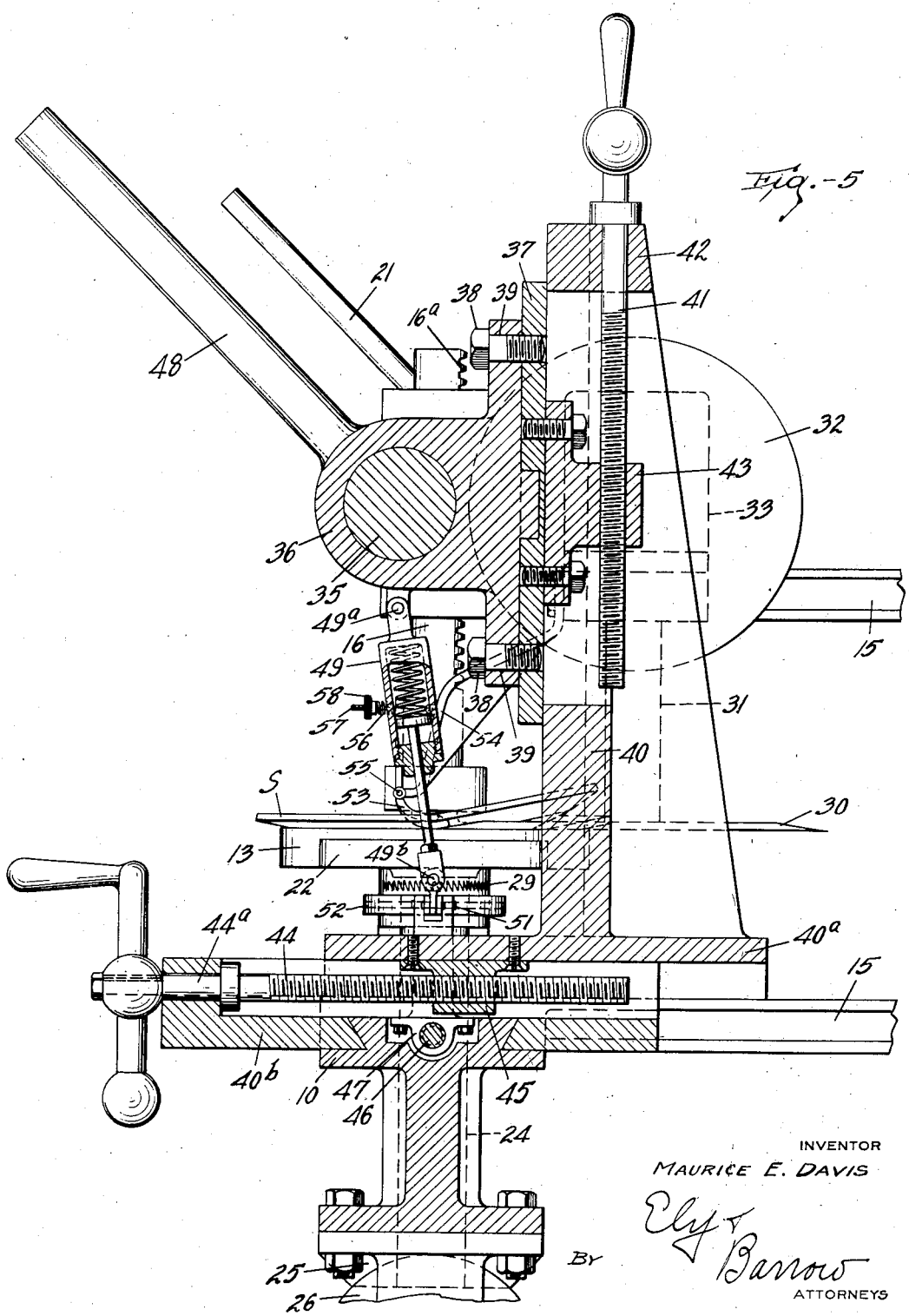

Patented Dec. 18, 1934

1,984,919

UNITED STATES PATENT OFFICE 1,984,919

METHOD AND APPARATUS FOR MAKING SKIVED OR BEVEL-EDGED ARTICLES FROM FLEXIBLE MATERIAL

Maurice E. Davis, Grand Rapids, Mich., assignor to Harry E. Moyses, New York, N. Y.

Application January 26, 1931, Serial No. 511,291

12 Claims. (Cl. 164—63)

This invention relates to procedure and apparatus for making skived or bevel-edged articles such as tire patches, shoe parts, etc., from flexible sheet material such as rubberized fabric stock.

Heretofore in the manufacture of such articles it has been customary to punch the article in the desired outline from the sheet material. This operation is performed on punch presses, referred to in the art as "clicking" machines. The next operation is skiving the articles or forming a beveled or feather edge thereon, this being performed in special skiving machines.

The general purpose of the present invention is to provide a method and apparatus by which such articles may be effectively cut to shape from the sheet material and skived as a single operation.

More particularly the invention has for its purpose the provision of a method and means whereby the sheet stock may be clamped with a depressed portion of the outline of the article and a cutter actuated along a predetermined path about the clamped stock to cut a piece therefrom of said outline and beveled or skived at its edge.

The foregoing and other purposes of the invention are attained in the machine and by the method illustrated in the accompanying drawings. The invention is not limited, however, to the particular machine or to the particular method shown and described herein.

Of the accompanying drawings,

Figure 1 is a front elevation of a machine embodying the invention;

Figure 2 is an end view looking from the left of Figure 1, the full line positions of the parts being the positions thereof when the article is being cut to shape and the dotted line positions indicating the relation of the parts between cutting operations;

Figure 3 is a sectional plan on line 3—3 of Figure 1;

Figure 4 is a section on line 4—4 of Figure 1;

Figure 5 is a section on line 5—5 of Figure 1; and

Figure 6 is an elevation, partly in section, of a tire patch made in accordance with the invention.

Referring to the drawings, the numeral 10 designates a suitable support upon which is slidably mounted a carriage 11. The carriage 11 has journaled therein a rotatable shaft 12 (see Figure 4) which is adapted removably to receive a rotary forming element 13 which may be threaded thereon as at 14 whereby elements of different shapes may be replaceably mounted in the machine.

The element 13 is of an outline corresponding to that of the article to be produced, the element herein shown being shaped to form an oval tire patch such as illustrated in Figure 6. The element 13 is hollow and open at its top providing a receptacle for a resilient pad such as a sponge rubber pad 13ª secured therein and shaped to provide a cavity into which a portion of the stock may be depressed with the edge of the cavity defining the outline of the article.

The carriage 11 is provided with a C-shaped bracket 15 (see Figure 2), the upper portion of which overhangs element 13 and which has therein a plunger 16 slidable toward and from element 13 and carrying a clamp 17 on its lower end, this clamp being supported in a bearing 18 removably secured upon the plunger 16 as by being threaded thereon at 19 whereby clamp members such as 17 of different shapes and sizes are replaceable in the machines.

As best shown in Figure 4, the forming element 13 is dish-shaped and the clamp 17 is convex, whereby flexible stock S clamped between the members will be held in concavo-convex shape.

The operating plunger 16, may have a rack 16ª formed thereon with which a pinion 20 (see Figure 2) journaled on bracket 15 is meshed, said pinion being operable by suitable means such as a lever 21 secured thereto.

For rotating the forming element and clamp 17, a friction wheel 22 is provided, the periphery of the forming element 13 being held in engagement with said friction wheel by means of yielding means such as springs 23 which tend to urge the carriage 11 toward the friction wheel 22. The friction wheel 22 may be mounted upon a shaft 24, upon which is a bevel gear 25 meshed with a bevel gear 26 on a shaft 27 which may be driven by a pulley 28. The friction wheel 22 is preferably arranged to be clutched to shaft 24 when the cutting and skiving of the article is effected by a clutch 29 operable automatically in a manner which will later be explained.

The cutting is shown at 30 and preferably comprises a rotary cutting disc which in operative position is adapted to overlie the edge of the former 13 so as to cut angularly through the margins of the stock S which extend angularly from the former 13 due to the shaping thereof in the forming element, the line of cut being where the dotted line indicating the invisible edge of the former 13 is shown in Figure 4. Since the point at which friction wheel 22 engages the forming element is a fixed point at which the cutting may be performed, the cutter 30 is arranged when in operative position to engage with the forming element adjacent this point.

The cutter 30 is secured upon a shaft 31 arranged to be driven by a motor 32 through suitable gearing housed at 33. The motor is mounted on an arm 34 adapted to rock on a shaft 35 secured in a support 36 angularly adjustable upon a slidable plate 37 upon which it may be secured in adjusted positions by bolts 38, 38 extending through arcuate slots 39, 39 in member 36. Plate 37 is vertically adjustable upon a standard 40 by suitable means such as a screw 41 journaled at 42 in standard 40 and threaded through a member 43 secured to the rear side of plate 37. Standard 40 is provided with a carriage 40$^a$ transversely slidable upon a carriage 40$^b$ which is longitudinally slidable upon the support 10 whereby the cutter is universally adjustable to various angles and to various planes for operating in association with various formers 13.

Carriage 40$^a$ may be operated by means of a screw 44 journaled at 44$^a$ on carriage 40$^b$ and threaded through a member 45 secured to carriage 40$^a$ and carriage 40$^b$ may be operated by a screw 46 journaled on support 10 and threaded through a member 47 secured to carriage 40$^b$.

A lever 48 may be provided for swinging the knife to and from operative relation respecting the former 13 and also for operating clutch 29 as by means of a yielding link 49 pivotally connected to arm 36 (see Figure 5) at 49$^a$ and having a universal connection at 49$^b$ with a lever 50 pivoted on support 10 at 51 and having a clutch shifting yoke 52 thereon.

In order to hold the stock S firmly in position adjacent the cutter, a presser 53 is provided for pressing the stock down against the former 13 in advance of the cutter (see Figure 3). As best shown in Figure 4, the presser 53 is pivoted upon a bracket 54 at 55 and is yieldingly urged against the stock by means of a spring 56 on a rod 57 pivoted on bracket 54 and on which the pressure of the spring may be adjusted by a knurled nut 58 threaded on rod 57.

In operation, the stock S either in short pieces or lengths are placed on the former 13 and pressed thereon by the clamp 17 so as to assume the shape of the former and with the margins about the former extending angularly therefrom.

The knife 30 is then swung down into operative relation with the former, the presser 53 engaging the stock in advance of the knife and rotation of the former and clamp with the work is effected by engagement of clutch 29. The former is rotated by the wheel 22, the carriage 11 moving to and fro as required to present the perimeter of the cavity in the former to the edge of the knife whereby the stock projecting from the cavity is progressively cut off with a skive or bevel cut.

The apparatus is so designed as to produce relative movement of the knife and former whereby the knife will cut progressively about the perimeter of the former. As illustrated in the drawings (Figure 3) the knife is caused to rotate outwardly of the advancing edge of the former 3.

By the foregoing procedure and with the use of the above-described apparatus, the operations of cutting and skiving articles from sheet material are accomplished simultaneously in a simple, effective way.

Modifications of the invention obviously may be resorted to without departing from the spirit thereof or the scope of the appended claims.

What is claimed is:—

1. That method of cutting skived or beveled edged articles from flexible sheet material which comprises depressing the same into a cavity of the outline of the desired article and clamping the depressed portion in the cavity with the margins of the depressed portion of the sheet extending angularly out of the edges of the cavity and cutting the margins of the sheet from the depressed portion progressively all about the perimeter of said cavity by a cut directed outwardly thereof and substantially in a plane parallel with that of the edge of the cavity to form a skived or beveled edge.

2. That method of making skived or beveled edged articles from flexible sheet material comprising forming a portion of the sheet material to concavo-convex shape to the outline of the article and cutting the remainder of the sheet from the article progressively all about the outline thereof by a cut directed outwardly of said outline in the plane of the outline of the article whereby the edges of the article will be skived.

3. Apparatus for making skived or beveled edged articles from flexible sheet material which comprises means for forming a portion of the sheet material with a depression therein having the outline of the desired article, means for rotating the material so formed so that the outline of the depressed portion will pass a fixed point, and means for cutting the remainder of the sheet material from said article adjacent said fixed point, said cutting means being arranged to cut said sheet material in a plane at an angle to the marginal portion of the dished material.

4. Apparatus for making skived or beveled edged articles from flexible sheet material which comprises means for forming a portion of the sheet material in dished shape to the outline of the article, said means comprising a former having a cavity therein and a clamp for depressing the material into said cavity, means for rotating said means so that the outline of said cavity will pass a fixed point, and means for cutting the remainder of the sheet material from said article adjacent said fixed point, said cutting means being arranged to cut said sheet material in a plane at an angle to the marginal portion of said cavity.

5. Apparatus for making skived or beveled edged articles from flexible sheet material which comprises means for forming a portion of the sheet material in dished shape to the outline of the article, said means being rotatable and bodily shiftable, means for rotating and bodily shifting said means so that the outline of the depressed portion of the material will pass a fixed point, said rotating and shifting means comprising a driving element engaging the periphery of said forming means, means for yieldingly holding the periphery of said forming means in engagement with said driving element, and means for cutting the remainder of the sheet material from the depressed portion of said material adjacent said fixed point, said cutting means being arranged to cut said sheet material in a plane at an angle to the marginal portion of the depressed material.

6. Apparatus for making skived or beveled edged articles from flexible sheet material which comprises means for forming a portion of the sheet material in dished shape to the outline of the article, means for rotating said forming means so that the outline of the depressed portion of the material will pass a fixed point, and means for cutting the remainder of the sheet material from said depressed portion adjacent said fixed point, said cutting means being arranged to cut said sheet material in a plane at an angle to the marginal portion of said depressed material, said cutting means comprising a rotary cutter and means for swinging said cutter to and from operative relation with said forming means.

7. Apparatus for making skived or beveled edged articles from flexible sheet material which comprises means for forming a portion of the sheet material in dished shape to the outline of the article, means for rotating said forming means so that the outline of the depressed portion of the material will pass a fixed point, and means for cutting the remainder of the sheet material from said depressed portion adjacent said fixed point, said cutting means being arranged to cut said sheet material in a plane at an angle to the marginal portion of the depressed material, said cutting means comprising a rotary cutter and means for swinging said cutter to and from operative relation with said clamping means and for controlling the operation of said rotating means.

8. Apparatus for making skived or beveled edged articles of flexible sheet material comprising means for depressing a portion of the sheet material to the outline of the article with the margins thereof extending angularly, and means for progressively cutting the remainder of the sheet away from said portion by a cut directed outwardly all about the outline of the depressed material and substantially in a plane at an angle to said margins of the depressed material whereby the resulting article will have a skived or beveled edge.

9. The combination in apparatus for the purpose described of means for clamping a sheet of flexible material in a cavity of a determinate outline, and means for cutting said material comprising a cutter in a plane substantially parallel to the plane of the outline of said cavity and so associated with said cavity as to cut the material at one point on said outline to provide a beveled edge on the material, and means for causing relative movement of said clamping means and said knife progressively to cut said material in one direction entirely about said cavity.

10. The combination in apparatus for the purpose described of means for clamping a sheet of flexible material in a cavity of a determinate outline, and means for cutting said material comprising a cutter in a plane substantially parallel to the plane of the outline of said cavity and so associated with said cavity as to cut the material at one point on said outline to provide a beveled edge on the material, and means for causing relative movement of said clamping means and said knife progressively to cut said material in one direction about said cavity, said knife having a traveling cutting edge and being so associated with said clamping means as to travel outwardly of said outline of the cavity with respect to the material at the point of cutting.

11. That method for making skived or beveled edged articles from flexible sheet material which comprises depressing said material in a cavity of predetermined outline, engaging a knife with the material at one point on said outline with the knife in a plane substantially parallel to the plane of said outline, and progressively cutting said material with said knife from said point in one direction entirely about the outline of said cavity.

12. That method for making skived or beveled edged articles from flexible sheet material which comprises depressing said material in a cavity of predetermined outline, engaging a knife with the material at one point on said outline with the knife in a plane substantially parallel to the plane of said outline, and progressively cutting said material with said knife from said point in one direction about the outline of said cavity, the knife being so applied as to cut in a direction outwardly of the cavity all about said outline.

MAURICE E. DAVIS.